T. BOLLIN.
AEROPLANE.
APPLICATION FILED SEPT. 23, 1912.
1,117,315.
Patented Nov. 17, 1914.
4 SHEETS—SHEET 1.
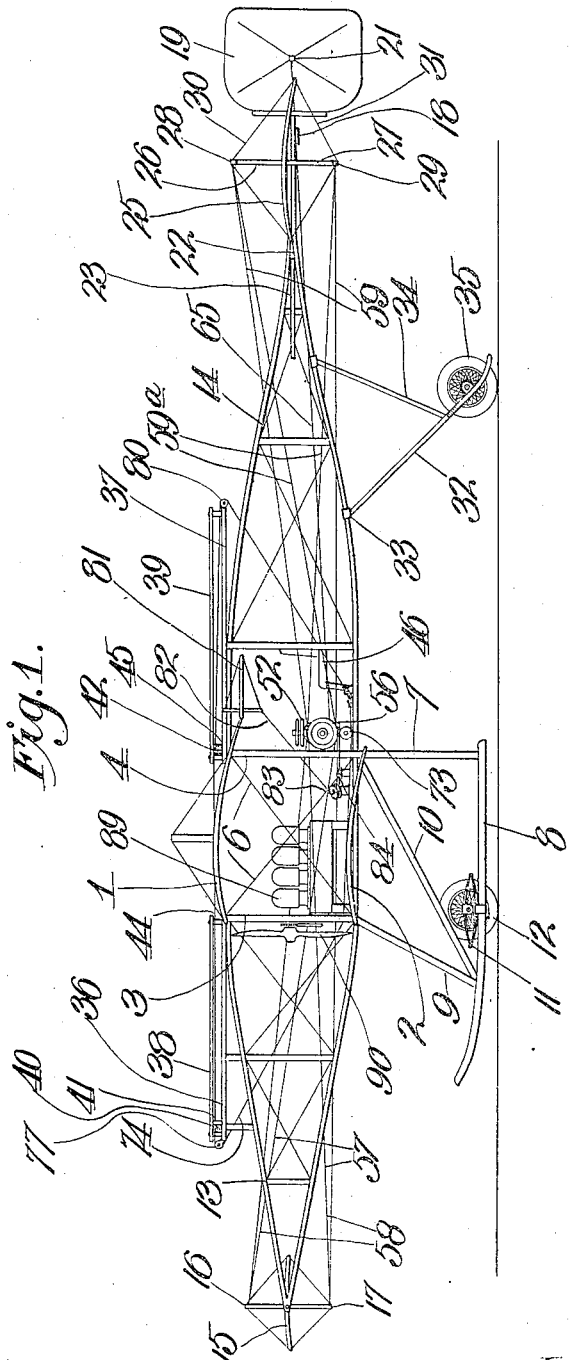

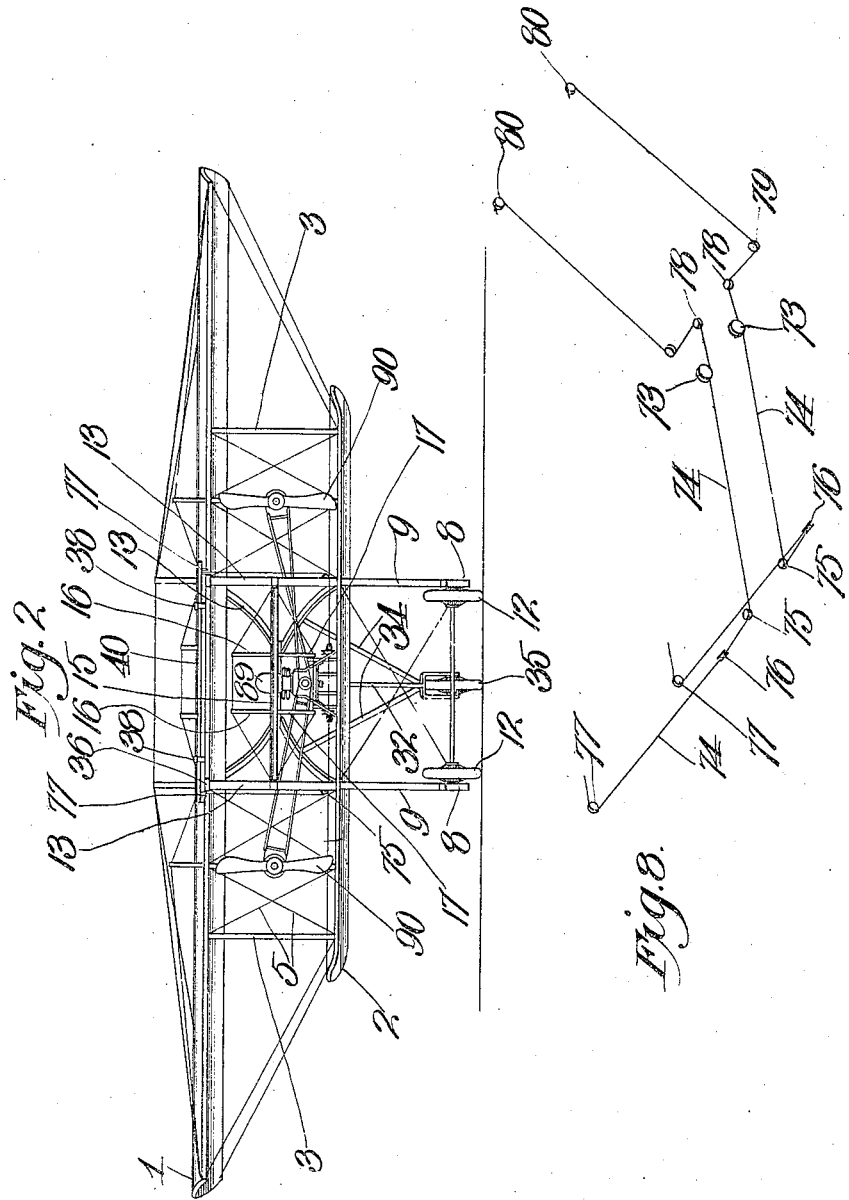

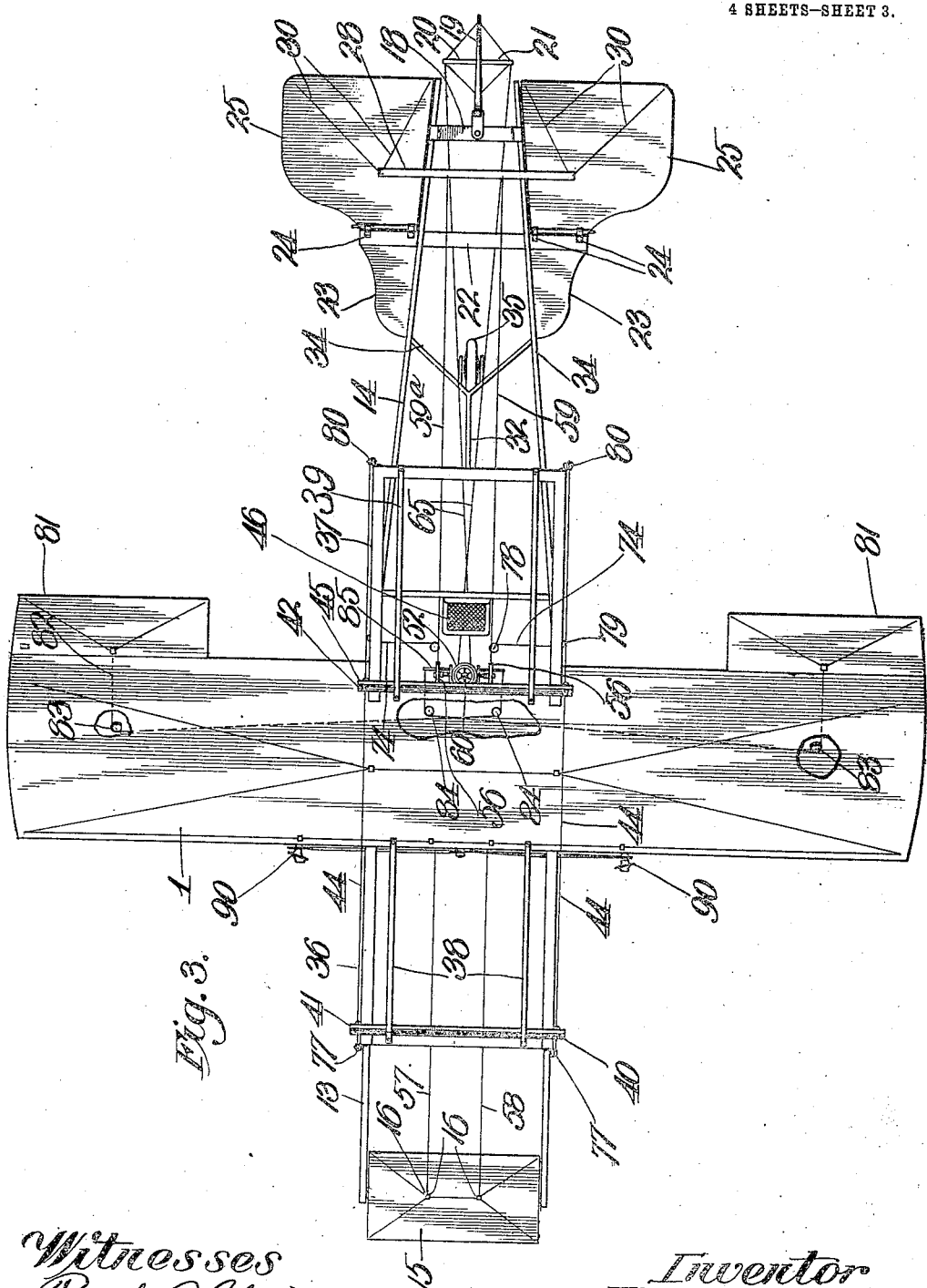

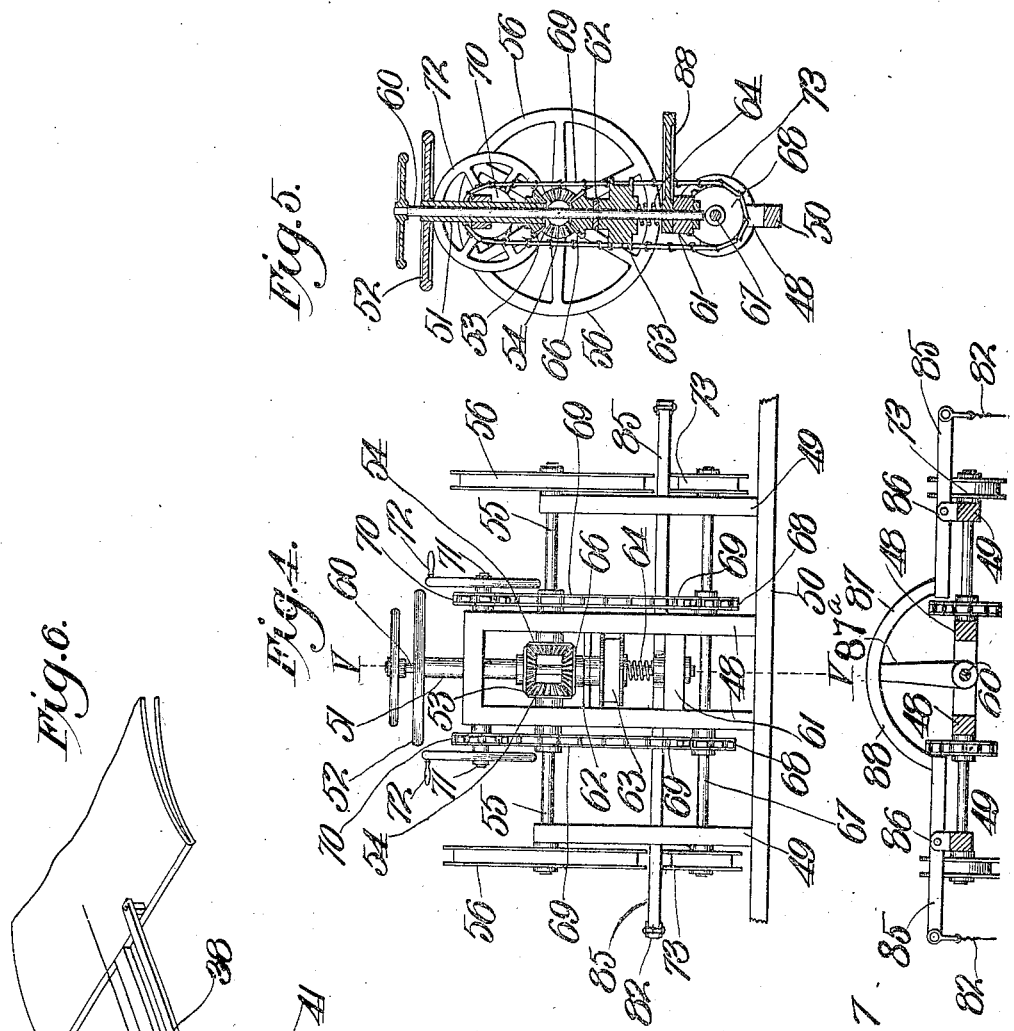

UNITED STATES PATENT OFFICE.

THEODORE BOLLIN, OF KANSAS CITY, MISSOURI.

AEROPLANE.

1,117,315.

Specification of Letters Patent.

Patented Nov. 17, 1914.

Application filed September 23, 1912. Serial No. 721,945.

*To all whom it may concern:*

Be it known that I, THEODORE BOLLIN, a citizen of the United States, residing at Kansas City, in the county of Jackson and State of Missouri, have invented certain new and useful Improvements in Aeroplanes, of which the following is a specification.

This invention relates to aeroplanes, and has for its object to produce a machine of this character which in the event of necessity, can be converted into a parachute to eliminate or reduce to the minimum, the danger attendant upon the descent of the machine to the ground.

With this general object in view and others as hereinafter appear, the invention consists in certain novel and peculiar features of construction and organization as hereinafter described and claimed; and in order that it may be fully understood reference is to be had to the accompanying drawings, in which—

Figure 1, is a side elevation of an aeroplane embodying my invention. Fig. 2, is a front view of the same. Fig. 3, is a top plan view of the same. Fig. 4, is an enlarged front elevation of the control mechanism. Fig. 5, is a section on the line V—V of Fig. 4. Fig. 6, is a fragmentary perspective view of the main plane and an auxiliary folding plane. Fig. 7, is a horizontal section showing means whereby the ailerons of the machine are operated. Fig. 8, is a detail showing certain cables.

In the said drawings where like reference characters identify corresponding parts in all the figures, 1 is the main plane of the machine, the same corresponding substantially in form and arrangement to the upper plane of the biplanes in common use, and underlying but narrower and shorter than said plane, is a substantially similar plane 2, the same being of less area than plane 1, for the purpose of centralizing the weight below the middle of the main plane. The planes near their front margins are connected by the customary struts 3, similar struts 4 connecting the rear portions of plane 2 with plane 1, some distance forward of its rear margin. Each set of said struts is braced by crossed wires 5, crossed wires 6 being also employed between the two sets of struts.

Two of the rear struts 4 at a suitable distance apart and equal distances from the longitudinal center of the planes, are provided with depending extensions 7, and projecting forwardly from the lower ends of the same are longitudinal bars 8, which curve upwardly at their front ends by preference, to accommodate the machine to irregularities in the surface of the ground in its travel thereon preliminary and subsequent to making a flight, and said bars are held reliably in place by downwardly and forwardly extending bars 9, and inclined braces 10. Springs 11 are mounted upon the bars 8, and carry suitably journaled wheels 12, upon which are supported the front end of the machine when on the ground.

The fuselage of the machine, which extends longitudinally as is customary, consists of a front portion 13 and a rear portion 14 in fixed relation to the planes, and pivoted to the front end of portion 13 for movement in a vertical plane, is a horizontal rudder 15, equipped with upwardly and downwardly projecting arms 16 and 17. The sides of the rear portion of the fuselage converge rearwardly by preference, and near their rear ends are connected by a cross bar 18, upon which is pivoted for lateral movement, the vertical rudder 19, and said rudder is provided with oppositely projecting arms 20 and 21.

22 is a cross bar mounted on the rear portion of the fuselage, and secured to the ends of the same and to the fuselage in any suitable manner, are stabilizing planes 23, and located rearward of said cross bar and at opposite sides of the fuselage and hinged at 24 to the former for up and down movement, are horizontal rudders 25, provided with upwardly-projecting arms 26, and depending arms 27, the upwardly projecting arms being connected by a cross bar 28 above and the depending arms by a cross bar 29 underlying the fuselage, suitable inclined braces 30 extending from the rear portions of said rudders to the upper ends of arms 26, and similar braces 31 from the rear portions of the rudders to the lower ends of the depending arms 27.

The rear portion of the fuselage is mounted upon a wheeled frame, consisting of a bar 32, extending downwardly and rearwardly from a cross bar 33 of the fuselage, a pair of downwardly converging bars 34, secured at their upper ends to the lower sides of the fuselage and at their lower ends to bar 32, and a wheel 35 journaled in the lower end of bar 32.

36 and 37 are similar rectangular frames arranged horizontally forward and rearward respectively, of the upper plane, and vertically above the fuselage, and located slightly above and connecting the front cross bar of frame 36 with the front edge of plane 1, is a pair of longitudinal bars 38, a similar pair of bars 39 being raised above and connecting the rear cross bar of frame 37 with the rear portion of plane 1.

40 is a folding plane or curtain adapted preferably to fold up like an accordion, and provided at its rear end with a cross bar 41, the front end of the curtain or folding plane being securely fastened in any suitable manner to the said cross bar of the frame 36. The curtain or folding plane is of such width as to bridge the space between the side bars of said frame, and the same is true of bar 41 which, with the curtain or folding plane, is interposed between the said side bars and the longitudinal bars 38, which latter when the accordion or folding plane is extended or unfolded, prevents the curtain or auxiliary plane from moving materially upward.

An auxiliary or folding plane 42 of the construction described or of any other suitable or preferred construction, is arranged between the rear frame 37, and the longitudinal guide bars 39 thereof, corresponding in all respects to bars 38, the other end of the curtain or plane 42 overlapping and being secured in fixed relation to the plane 1.

44 are cables connecting the bar 41 of the front curtain or plane with a similar bar 45 of the rear curtain or folding plane, so that movement imparted to one of the curtains or auxiliary planes whereby the same is folded or unfolded, shall effect the folding or unfolding as the case may be, of the other curtain, through instrumentalities hereinafter described.

46 is a seat carried by the fuselage rearward of and near the lower plane, and forward of and within convenient reach of said seat and rigidly mounted upon the fuselage, is a central inverted U-shaped bearing standard 48 and a pair of standards 49 at opposite sides of standard 48, all of said standards being preferably mounted upon a cross bar 50 of the fuselage.

51 is a vertical shaft journaled in the upper end of frame 48, and provided at its upper end with a hand wheel 52, and at its lower end with a bevel gear 53, meshing with a pair of bevel gears 54, secured on the inner ends of a pair of horizontal shafts 55, journaled at their inner ends in standard 48 and at their outer ends in standards 49, and secured on the outer ends of shafts 55 are grooved sheaves or drums 56. Engaging one of said drums 56 is a doubled cable 57 which is attached at its front ends to one of the arms 16 and one of the arms 17 of the front rudder 15. A crossed cable 58 engages the other drum 56, and is attached at its ends to the other pair of arms 16 and 17 of the front rudder. A doubled cable 59 also engages one of the drums 56, and is attached at its opposite ends to a pair of the arms 26 and 27 of the rear horizontal rudder, and a crossed cable 59ª engages the other drum 56, and is attached at its rear ends to the other pair of arms 26 and 27 of the rear horizontal rudder, the arrangement being such that rotation imparted to shaft 51 shall effect simultaneous reversed movement to the drums 56, for the purpose of adjusting the front and rear horizontal rudders to deflect or guide the machine upwardly or downwardly or to tend to sustain the same at a level flight.

60 is a vertical shaft extending through and journaled in shaft 51, and also journaled in a cross bar 61 and a cross bar 62 connecting the legs of the U-shaped standard 48, and keyed to slide upon and turn with shaft 60, is a drum 63, held with a yielding pressure by a spring 64, against cross bar 62. Engaging said drum is a cable 65 connected at one end to the opposite ends of arms 20 and 21 of the vertical rudder 19, said cable being crossed as shown in Fig. 3, to effect the proper operation of said vertical rudder.

The frictional engagement of the drum 63 with cross bar 62, is for the purpose of preventing accidental movement of the vertical rudder under the turning movement of shaft 51 through a bevel gear 66 journaled on shaft 60 and engaging bevel gears 54, the said bevel gear 66 being an idle gear which acts as a brace for the inner ends of the shafts 55.

For opening or folding the curtains or auxiliary planes 40 and 42, hereinbefore described, a shaft 67 is journaled in standards 48 and 49, and is provided with sprocket wheels 68 connected by sprocket chains 69 to sprocket wheels 70 journaled on stub shafts 71 carried by the standard 48, and also journaled on said shafts and secured rigidly to sprocket wheels 70, are hand wheels 72, whereby motion is imparted to shaft 67.

The last-named shaft is equipped at its ends with drums 73, and engaging said drums are cables 74 which extend forwardly and rearwardly from said drums. The forwardly extending portions of said cables engage guide sheaves 75 and 76 carried by the fuselage, and then extend around guide sheaves 77 secured to the ends of frames 36, and from said guide sheaves 77 extend rearwardly and are attached to the ends of bar 41, as shown most clearly in Fig. 6. The rearwardly-extending portions of cables 74, extend around guide sheaves 78 and 79, and from the latter extend upwardly and around guide sheaves 80, secured to the rear corners of frames 37, and then extend forwardly to bar 45 of the rear curtain or auxiliary plane, to which bar they are reliably attached. By this arrangement it will be seen that the operation of either or both of the hand wheels 72 in one direction, will unfold the curtains or auxiliary planes and cause them to bridge the spaces inclosed by said frames 36 and 37 and the main plane 1, and thus in conjunction with the latter, and the smaller underlying plane 2, act like a parachute in guarding against overturning of the machine in its descent if beyond the control of the operator, it being understood that should the operator lose control, that he will immediately open these curtains or auxiliary planes to accomplish the result mentioned, and that when the machine is under control the curtains or auxiliary planes will be in folded condition.

Projecting from the rear edge of plane 1, near the outer ends thereof, is a pair of ailerons 81, which under normal conditions occupy a neutral or substantially horizontal position, and each is connected by a cable 82 guided around sheaves 83 and 84 suitably supported from the rear portion of the fuselage, to a separate lever 85 fulcrumed at 86 on one of the standards 49, and for the purpose of operating the right hand aileron when the vertical rudder is turned in that direction, and the left-hand aileron when said rudder is turned to the left, the shaft 60 is equipped with a crank 87ª having the rigid curved arms 87 and 88 to respectively operate the left or righthand lever 85. By this arrangement one of the ailerons assists in turning the machine and, because it is swung downward, assists in sustaining the machine during the turning movement, it being understood that the ailerons are, during flight, supported in horizontal position by the action of the air, so that the levers 85 are held normally against the arms 87 and 88, and should the vertical rudder be incapacitated for service, the operation of the steering wheel 61, in the regular way, will result in turning the machine in the desired direction because only one aileron at a time is adjusted to an angle to the line of flight, the other retaining its neutral or inoperative position.

The engine 89 is suitably supported on the longitudinal axis of the machine forward and within the reach of the operator, and is connected in any well known manner (not shown) to a pair of propellers 90, though one propeller may be employed if desired.

From the above description it will be apparent that I have produced an aeroplane possessing the features of advantage enumerated as desirable, and I wish it to be understood that I do not desire to be restricted to the exact details of construction shown and described, but reserve the right to make all changes properly falling within the spirit and scope of the appended claims.

I claim:

1. In an aeroplane, an upper main plane and a plane below and spaced from and of smaller area than the upper plane, in combination with planes forward and rearward of and in substantially the same plane as the said main plane; said forward and rearward planes being folding planes and substantially shorter transversely than the main plane and when unfolded forming in conjunction with the main plane an unbroken or continuous cross-shaped plane.

2. In an aeroplane, an upper main plane and a plane below and spaced from and of smaller area than the upper plane, in combination with planes forward and rearward of and in substantially the same plane as the said main plane, said forward and rearward planes being folding planes and substantially shorter transversely than the main plane and when unfolded forming in conjunction with the main plane an unbroken or continuous cross-shaped plane, and means for simultaneously unfolding said planes.

3. An aeroplane, comprising an upper or main plane of greatest length transversely, a smaller plane below the first-named plane, a fuselage extending at right angles to said planes, a horizontal and a vertical rudder mounted on the fuselage, a pair of frames in substantially the same plane as the first-named plane and forward and rearward thereof, folding planes carried by said frames and adapted when in open or operative position to bridge the spaces between said main plane and the ends of said frames, and when closed or in inoperative position to leave said spaces unbridged, connections between said folding planes to transmit motion from one to the other, a shaft, a pair of drums upon the shaft, and a cable secured to each drum, said cables being connected at their rear ends to one of the folding planes and at their front ends to the other folding plane.

4. An aeroplane, comprising a fuselage, a plane extending transversely of the fuselage at both sides thereof, a vertical rudder at the rear end of the fuselage, a pair of ailerons projecting rearwardly from the s plane at opposite sides of the fuselage, a vertical shaft, connections between said shaft and the rudder to turn the latter to the right or to the left, a pair of arms rotatable with said shaft, a pair of levers adapted to be operated independently by said arms, and suitably guided cables connecting the levers with different ailerons whereby the right hand aileron only shall be operated when the rudder is turned to the right and the left hand aileron only when the rudder is turned to the left.

In testimony whereof I affix my signature, in the presence of two witnesses.

THEODORE BOLLIN.

Witnesses:
 HELEN C. RODGERS,
 G. Y. THORPE.